(12) United States Patent
Zeng et al.

(10) Patent No.: US 10,319,978 B2
(45) Date of Patent: Jun. 11, 2019

(54) MULTI-TABBED ELECTRODES HAVING HIGH ASPECT RATIOS AND BATTERIES INCORPORATING THE SAME

(71) Applicant: GM GLOBAL TECHNOLOGY OPERATIONS LLC, Detroit, MI (US)

(72) Inventors: Sherman Zeng, Troy, MI (US); Xiaochao Que, Shanghai (CN); Haijing Liu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 112 days.

(21) Appl. No.: 15/604,759

(22) Filed: May 25, 2017

(65) Prior Publication Data
US 2018/0342722 A1    Nov. 29, 2018

(51) Int. Cl.
| | |
|---|---|
| *H01M 2/26* | (2006.01) |
| *H01M 2/30* | (2006.01) |
| *H01M 2/20* | (2006.01) |
| *H01M 4/70* | (2006.01) |
| *H01M 10/0525* | (2010.01) |
| *H01M 10/0585* | (2010.01) |

(52) U.S. Cl.
CPC ............. *H01M 2/26* (2013.01); *H01M 2/206* (2013.01); *H01M 2/305* (2013.01); *H01M 4/70* (2013.01); *H01M 10/0525* (2013.01); *H01M 10/0585* (2013.01); *H01M 2220/20* (2013.01)

(58) Field of Classification Search
None
See application file for complete search history.

(56) References Cited

U.S. PATENT DOCUMENTS 9,583,781 B2    2/2017  Hwang et al.
2015/0180082 A1*  6/2015  Jung ............... H01M 10/0431
                                                                429/246

FOREIGN PATENT DOCUMENTS

CN    201038228 Y  *  3/2008
CN    203119042 U  *  8/2013

* cited by examiner

*Primary Examiner* — Jonathan Crepeau

(57) ABSTRACT

Lithium battery cells, and battery packs comprising the same, include an electrolyte, and an anode and a cathode, each of which include a current collector having a length, the length defining a first end and a second end, a width, a host or active material disposed on the current collector between the first end and the second end, a first tab extending from the first end, and a second tab extending from the second end. A plurality of cells can be stacked in a planar configuration, and a plurality of anode first tabs, a plurality of anode second tabs, a plurality of cathode first tabs, and a plurality of cathode second tabs can each be electrically connected via a respective busbar. The anode and cathode can have a length:width ratio of at least three, or 2.5 to 10. The battery cell can be a power source for an electric/hybrid vehicle.

18 Claims, 3 Drawing Sheets

MULTI-TABBED ELECTRODES HAVING HIGH ASPECT RATIOS AND BATTERIES INCORPORATING THE SAME

INTRODUCTION

Lithium ion batteries describe a class of rechargeable batteries in which lithium ions move between a negative electrode (i.e., anode) and a positive electrode (i.e., cathode). Liquid and polymer electrolytes can facilitate the movement of lithium ions between the anode and cathode. Lithium-ion batteries are growing in popularity for defense, automotive, and aerospace applications due to their high energy density and ability to undergo successive charge and discharge cycles.

SUMMARY

One or more embodiments provide lithium battery cells can include an electrolyte, an anode disposed within the electrolyte and including a current collector having a length, the length defining a first end and a second end, a width, an anode host material disposed on the anode current collector between the first end and the second end, a first tab extending from the first end, and a second tab extending from the second end, and a cathode disposed within the electrolyte and including a current collector having a length, the length defining a first end and a second end, a width, a cathode active material disposed on the cathode current collector between the first end and the second end, a first tab extending from the first end, and a second tab extending from the second end. The anode can have a length to width ratio of at least 2 and the cathode can have a length to width ratio of at least 2. The first tab of the cathode can be asymmetric to the second tab of the cathode, and/or the first tab of the anode can be asymmetric to the second tab of the anode. The first tab of the cathode can be symmetric to the second tab of the cathode, and/or the first tab of the anode can be symmetric to the second tab of the anode. The anode can have a length to width ratio of at least 3 and the cathode can have a length to width ratio of at least 3. The anode can have a length to width ratio of about 2.5 to about 10, and the cathode can have a length to width ratio of about 2.5 to about 10. The anode can have a length of about 300 millimeters to about 600 millimeters and a width of about 50 millimeters to about 100 millimeters, and the cathode can have a length of about 300 millimeters to about 600 millimeters and a width of about 50 millimeters to about 100 millimeters. The battery cell can further include a separator disposed between the anode and cathode and capable of allowing lithium ion transport between the anode and cathode. The lithium battery cell can be a lithium-ion battery cell, or a lithium metal battery cell.

A battery pack can include a plurality anodes, wherein each anode includes an anode length, the anode length defining an anode first end and an anode second end, an anode width, a first anode tab extending from the anode first end, and a second anode tab extending from the anode second end, a plurality of cathodes, wherein each cathode includes an cathode length, the cathode length defining an cathode first end and an cathode second end, an cathode width, a first cathode tab extending from the cathode first end, and a second cathode tab extending from the cathode second end, an anode busbar connecting the plurality of first anode tabs and the plurality of second anode tabs to a negative terminal, and a cathode busbar connecting the plurality of first cathode tabs and the plurality of second cathode tabs to a positive terminal. Each of the anodes can have a length to width ratio of at least 2 and each of the cathodes can have a length to width ratio of at least 2, and the anodes and cathodes can be stacked such that their respective length-width planes can be substantially planar. The battery pack can be a power source for an electric or hybrid vehicle. The anode can have a length to width ratio of about 2.5 to about 10, and the cathode can have a length to width ratio of about 2.5 to about 10. The battery pack can further include a separator disposed between the anode and cathode and capable of allowing lithium ion transport between the anode and cathode. The battery pack can be a lithium-ion battery pack, or a lithium metal battery pack.

A battery pack can include a plurality of stacked battery cells, each cell including an anode disposed including a length, the length defining a first end and a second end, a width, a first tab extending from the first end, and a second tab extending from the second end, and a cathode disposed within the electrolyte and including a length, the length defining a first end and a second end, a width, a first tab extending from the first end, and a second tab extending from the second end. The first tab of each anode can overlap and contact the first tab of at least one other anode, the second tab of each anode can overlap and contact the second tab of at least one other anode, the first tab of each cathode can overlap and contact the first tab of at least one other cathode, and the second tab of each cathode can overlap and contact the second tab of at least one other cathode. Each anode can have a length to width ratio of at least 1 and each cathode can have a length to width ratio of at least 1. The anode can have a length to width ratio of at least 2 and the cathode can have a length to width ratio of at least 2. At least one pair of overlapping cathode first tabs, cathode second tabs, anode first tabs, or anode second tabs can be laser welded or ultrasonically welded. The battery pack can further include a separator including a plurality of folds defining a plurality of subsections, wherein each sub section is disposed between two anodes, two cathodes, or an anode and a cathode. Each battery cell can be a lithium battery cell. The width of each first anode tab can be greater than a width defined by the two outer-most first anode tabs divided by the number of battery cells, and/or the width of each second anode tab can be greater than a width defined by the two outer-most second anode tabs divided by the number of battery cells, and/or the width of each first cathode tab can be greater than a width defined by the two outer-most first cathode tabs divided by the number of battery cells, and/or the width of each second cathode tab is greater than a width defined by the two outer-most second cathode tabs divided by the number of battery cells. The battery pack can be a power source for an electric or hybrid vehicle.

Other objects, advantages and novel features of the exemplary embodiments will become more apparent from the following detailed description of exemplary embodiments and the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
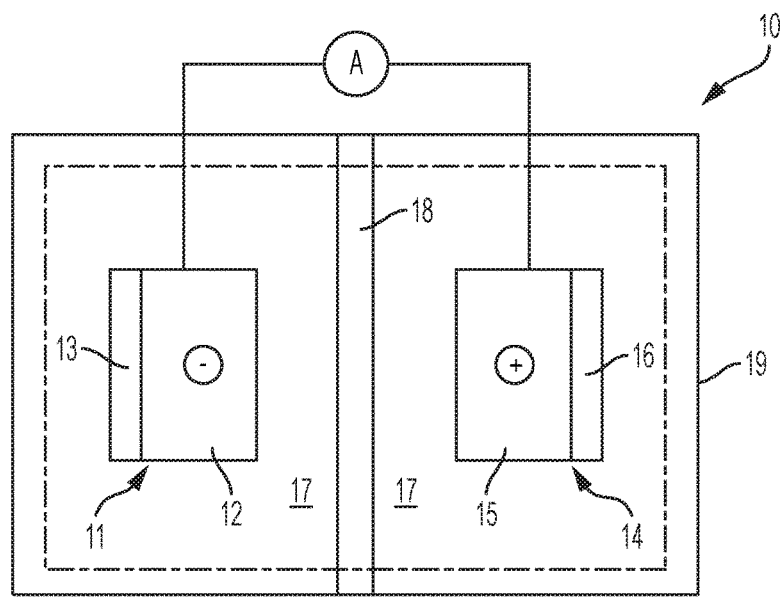
FIG. 1 illustrates a lithium battery cell, according to one or more embodiments.

FIG. 1 illustrates a lithium battery cell 10 comprising a negative electrode (i.e., the anode) 11, a positive electrode (i.e., the cathode) 14, an electrolyte 17 operatively disposed between the Anode 11 and the cathode 14, and a separator 18. Anode 11, cathode 14, and electrolyte 17 can be encapsulated in container 19, which can be a hard (e.g., metallic) case or soft (e.g., polymer) pouch, for example. The Anode 11 and cathode 14 are situated on opposite sides of separator 18 which can comprise a microporous polymer or other suitable material capable of conducting lithium ions and optionally electrolyte (i.e., liquid electrolyte). For example, the electrolyte can comprise a polymer or a liquid electrolytic solution. Liquid electrolytes 17 can include LiPF6, LiBF4, and LiClO4, among others, dissolved in a non-aqueous solvent. Polymer electrolytes 17 can include one or more polymers, such as polyethyleneoxide (PEO) or polyacrylonitrile, among others, and one or more lithium salts, such as LiPF6, LiBF4, LiClO4, LiSICON, or LiPON, among others. Anode 11 generally includes a current collector 12 and a lithium intercalation host material 13 applied thereto. Cathode 14 generally includes a current collector 15 and a lithium-based active material 16 applied thereto. In one example, anode 11 comprises lithium. In one embodiment, anode 11 comprises lithium and cathode 14 comprises sulfur. Active material 16 can store lithium ions at a higher electric potential than intercalation host material 13, for example. The current collectors 12 and 15 associated with the two electrodes are connected by an interruptible external circuit that allows an electric current to pass between the electrodes to electrically balance the related migration of lithium ions. Although FIG. 1 illustrates host material 13 and active material 16 schematically for the sake of clarity, host material 13 and active material 16 can comprise an exclusive interface between the anode 11 and cathode 14, respectively, and electrolyte 17.

Host material 13 can include any lithium host material that can sufficiently undergo lithium ion intercalation, deintercalation, and alloying, while functioning as the negative terminal of the lithium ion battery 10. Host material 13 can also include a polymer binder material to structurally hold the lithium host material together. For example, in one embodiment, host material 13 can include graphite intermingled in one or more of of polyvinyldiene fluoride (PVdF), an ethylene propylene diene monomer (EPDM) rubber, carboxymethoxyl cellulose (CMC), and styrene, 1,3-butadiene polymer (SBR). Graphite and carbon materials are widely utilized to form the negative electrode because it exhibits favorable lithium ion intercalation and deintercalation characteristics, is relatively non-reactive, and can store lithium ions in quantities that produce a relatively high energy density. Other materials can also be used to form the host material 13, for example, including one or more of lithium titanate, silicon, silicon oxide, tin, and tin oxide. Anode current collector 12 can includecopper, aluminum, stainless steel, or any other appropriate electrically conductive material known to skilled artisans. Anode current collector 12 can be treated (e.g., coated) with highly electrically conductive materials, including one or more of conductive carbon black, graphite, carbon nanotubes, carbon nanofiber, graphene, and vapor growth carbon fiber (VGCF), among others.

Active material 16 can include any lithium-based active material that can sufficiently undergo lithium intercalation and deintercalation while functioning as the positive terminal of battery cell 10. Active material 16 can also include a polymer binder material to structurally hold the lithium-based active material together. One common class of known materials that can be used to form active material 16 is layered lithium transitional metal oxides. For example, in various embodiments, active material 16 can comprise one or more of spinel lithium manganese oxide (LiMn2O4), lithium cobalt oxide (LiCoO2), a nickel-manganese-cobalt oxide [Li(NixMnyCoz)O2], or a lithium iron polyanion oxide such as lithium iron phosphate (LiFePO4) or lithium iron fluorophosphate (Li2FePO4F) intermingled in at least one of polyvinyldiene fluoride (PVdF), an ethylene propylene diene monomer (EPDM) rubber, carboxymethoxyl cellulose (CMC), and styrene, 1,3-butadiene polymer (SBR). Other lithium-based active materials can also be utilized besides those just mentioned. Those alternative materials include, but are not limited to, lithium nickel oxide (LiNiO2), lithium aluminum manganese oxide (LixAlyMn1-yO2), and lithium vanadium oxide (LiV2O5), to name but a few. Cathode current collector 15 can include aluminum or any other appropriate electrically conductive material known to skilled artisans, and can be formed in a foil or grid shape. Cathode current collector 15 can be treated (e.g., coated) with highly electrically conductive materials, including one or more of conductive carbon black, graphite, carbon nanotubes, carbon nanofiber, graphene, and vapor growth carbon fiber (VGCF), among others.

Any appropriate electrolyte solution that can conduct lithium ions between Anode 11 and cathode 14 can be used in battery cell 10. In one embodiment, the electrolyte solution can be a non-aqueous liquid electrolyte solution that includes a lithium salt dissolved in an organic solvent or a mixture of organic solvents. Skilled artisans are aware of the many non-aqueous liquid electrolyte solutions that can be employed in battery cell 10 as well as how to manufacture or commercially acquire them. A non-limiting list of lithium salts that can be dissolved in an organic solvent to form the non-aqueous liquid electrolyte solution include LiClO4, LiAlCl4, LiI, LiBr, LiSCN, LiBF4, LiB(C6H5)4 LiAsF6, LiCF3SO3, LiN(CF3SO2)2, LiPF6, and mixtures thereof.

These and other similar lithium salts can be dissolved in a variety of organic solvents such as, but not limited to, cyclic carbonates (ethylene carbonate, propylene carbonate, butylene carbonate), acyclic carbonates (dimethyl carbonate, diethyl carbonate, ethylmethylcarbonate), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane), cyclic ethers (tetrahydrofuran, 2-methyltetrahydrofuran), and mixtures thereof.

The microporous polymer separator 18 can comprise, in one embodiment, a polyolefin. The polyolefin can be a homopolymer (derived from a single monomer constituent) or a heteropolymer (derived from more than one monomer constituent), either linear or branched. If a heteropolymer derived from two monomer constituents is employed, the polyolefin can assume any copolymer chain arrangement including those of a block copolymer or a random copolymer. The same holds true if the polyolefin is a heteropolymer derived from more than two monomer constituents. In one embodiment, the polyolefin can be polyethylene (PE), polypropylene (PP), or a blend of PE and PP. Separator 18 can optionally be ceramic-coated with materials including one or more of ceramic type aluminum oxide (e.g., $Al_2O_3$), and lithiated zeolite-type oxides, among others. Lithiated zeolite-type oxides can enhance the safety and cycle life performance of lithium ion batteries, such as battery cell 10.

The microporous polymer separator 18 may be a single layer or a multi-layer laminate fabricated from either a dry or wet process. For example, in one embodiment, a single layer of the polyolefin may constitute the entirety of the microporous polymer separator 18. As another example, however, multiple discrete layers of similar or dissimilar polyolefins may be assembled into the microporous polymer separator 18. The microporous polymer separator 18 may also comprise other polymers in addition to the polyolefin such as, but not limited to, polyethylene terephthalate (PET), polyvinylidene fluoride (PVdF), and or a polyamide (Nylon). The polyolefin layer, and any other optional polymer layers, may further be included in the microporous polymer separator 18 as a fibrous layer to help provide the microporous polymer separator 18 with appropriate structural and porosity characteristics. Skilled artisans will undoubtedly know and understand the many available polymers and commercial products from which the microporous polymer separator 18 may be fabricated, as well as the many manufacturing methods that may be employed to produce the microporous polymer separator 18.

Battery cell 10 generally operates by reversibly passing lithium ions between Anode 11 and cathode 14. Lithium ions move from cathode 14 to Anode 11 while charging, and move from Anode 11 to cathode 14 while discharging. At the beginning of a discharge, Anode 11 contains a high concentration of intercalated lithium ions while cathode 14 is relatively depleted, and establishing a closed external circuit between Anode 11 and cathode 14 under such circumstances causes intercalated lithium ions to be extracted from Anode 11. The extracted lithium atoms are split into lithium ions and electrons as they leave an intercalation host at an electrode-electrolyte interface. The lithium ions are carried through the micropores of separator 18 from Anode 11 to cathode 14 by the ionically conductive electrolyte 17 while, at the same time, the electrons are transmitted through the external circuit from Anode 11 to cathode 14 to balance the overall electrochemical cell. This flow of electrons through the external circuit can be harnessed and fed to a load device until the level of intercalated lithium in the negative electrode falls below a workable level or the need for power ceases. The arrows indicate that current is flowing out of Anode 11 and that current is flowing into cathode 14, and thus battery cell 10 is shown in a charging state.

Battery cell 10 may be recharged after a partial or full discharge of its available capacity. To charge or re-power the lithium ion battery cell, an external power source (not shown) is connected to the positive and the negative electrodes to drive the reverse of battery discharge electrochemical reactions. That is, during charging, the external power source extracts the lithium ions present in cathode 14 to produce lithium ions and electrons. The lithium ions are carried back through the separator by the electrolyte solution, and the electrons are driven back through the external circuit, both towards Anode 11. The lithium ions and electrons are ultimately reunited at the negative electrode, thus replenishing it with intercalated lithium for future battery cell discharge.

Lithium ion battery cell 10, or a battery module or pack comprising a plurality of battery cells 10 connected in series and/or in parallel, can be utilized to reversibly supply power and energy to an associated load device. Lithium ion batteries may also be used in various consumer electronic devices (e.g., laptop computers, cameras, and cellular/smart phones), military electronics (e.g., radios, mine detectors, and thermal weapons), aircrafts, and satellites, among others. Lithium ion batteries, modules, and packs may be incorporated in a vehicle such as a hybrid electric vehicle (HEV), a battery electric vehicle (BEV), a plug-in HEV, or an extended-range electric vehicle (EREV) to generate enough power and energy to operate one or more systems of the vehicle. For instance, the battery cells, modules, and packs may be used in combination with a gasoline or diesel internal combustion engine to propel the vehicle (such as in hybrid electric vehicles), or may be used alone to propel the vehicle (such as in battery powered vehicles).

Figure 2:
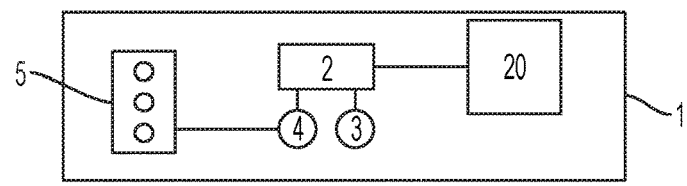
FIG. 2 illustrates a schematic diagram of a hybrid-electric vehicle, according to one or more embodiments.

FIG. 2 illustrates a schematic diagram of a hybrid-electric vehicle 1 including a battery pack 20 and related components. A battery pack such as the battery pack 20 can include a plurality of battery cells 10. A plurality of battery cells 10 can be connected in parallel to form a group, and a plurality of groups can be connected in series, for example. One of skill in the art will understand that any number of battery cell connection configurations are practicable utilizing the battery cell architectures herein disclosed, and will further recognize that vehicular applications are not limited to the vehicle architecture as described. Battery pack 20 can provide energy to a traction inverter 2 which converts the direct current (DC) battery voltage to a three-phase alternating current (AC) signal which is used by a drive motor 3 to propel the vehicle 1. An engine 5 can be used to drive a generator 4, which in turn can provide energy to recharge the battery pack 20 via the inverter 2. External (e.g., grid) power can also be used to recharge the battery pack 20 via additional circuitry (not shown). Engine 5 can comprise a gasoline or diesel engine, for example.

Figure 3A:
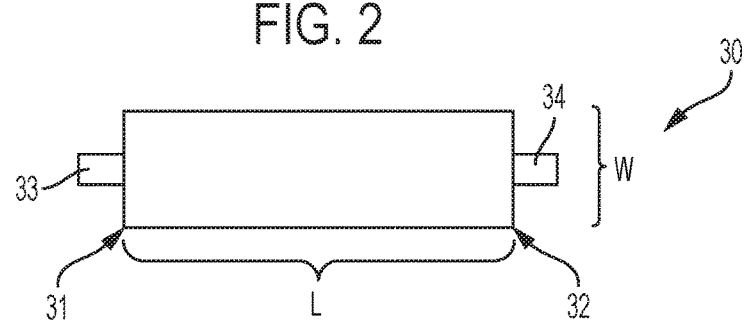
FIG. 3A illustrates a top view of an electrode, according to one or more embodiments.

FIG. 3A illustrates a top view of an exemplary electrode 30 suitable for use in anode 11 and/or cathode 14. In particular, it is the dimension and arrangement of electrode elements which lend enhanced performance to battery cells, as will be described below. Electrode 30 is characterized by a width W and a length L, the latter defining a first end 31 and a second end 32. Length L and width W define a top face and a bottom face, for example. To the extent that the length L and width W dimensions of electrode 30 are described, such are applicable to either a current collector, or a current collector in combination with a suitable coating (e.g., a lithium intercalation host material or a lithium-based active material), as the latter when applied to the former will be tailored to substantially the same length and width dimensions. Electrode 30 as defined by length L and width W is illustrated as a rectangle, but other shapes are practicable, such as ovular shapes wherein the length L comprises an average length and the width W comprises an average width, for example.

Figure 3B:
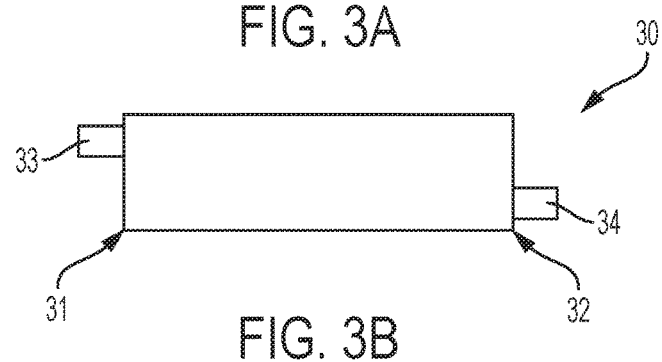
FIG. 3B illustrates a top view of an electrode, according to one or more embodiments.

Electrode 30 further comprises a first tab 33 extending from first end 31 and a second tab 34 extending from second end 32. In particular, first tab 33 and second tab 34 extend from the electrode 30 current collector and are electrically connected thereto. A tab can be defined as a portion of an electrode that does not include an active material or a host material, for example. First tab 33 and second tab 34 can comprise the same or similar material of construction as the electrode 30 current collector, or any other suitably electrically conductive material. A width of first tab 33 and second tab 34 can be less than the width W of electrode 30, as will be described below. Electrode 30 (including first tab 33 and second tab 34) can be a single piece construction, for example. First tab 33 and second tab 34 can be generally opposite from each other, and as shown in FIG. 3A can be symmetrically disposed at first end 31 and second end 32. Alternatively, as shown in FIG. 3B, first tab 33 and second tab 34 can be asymmetrically disposed at first end 31 and second end 32, for example to accommodate for packaging of multiple battery cells incorporating electrode 30, and/or to improve electrical properties, for example.

Figure 4A:
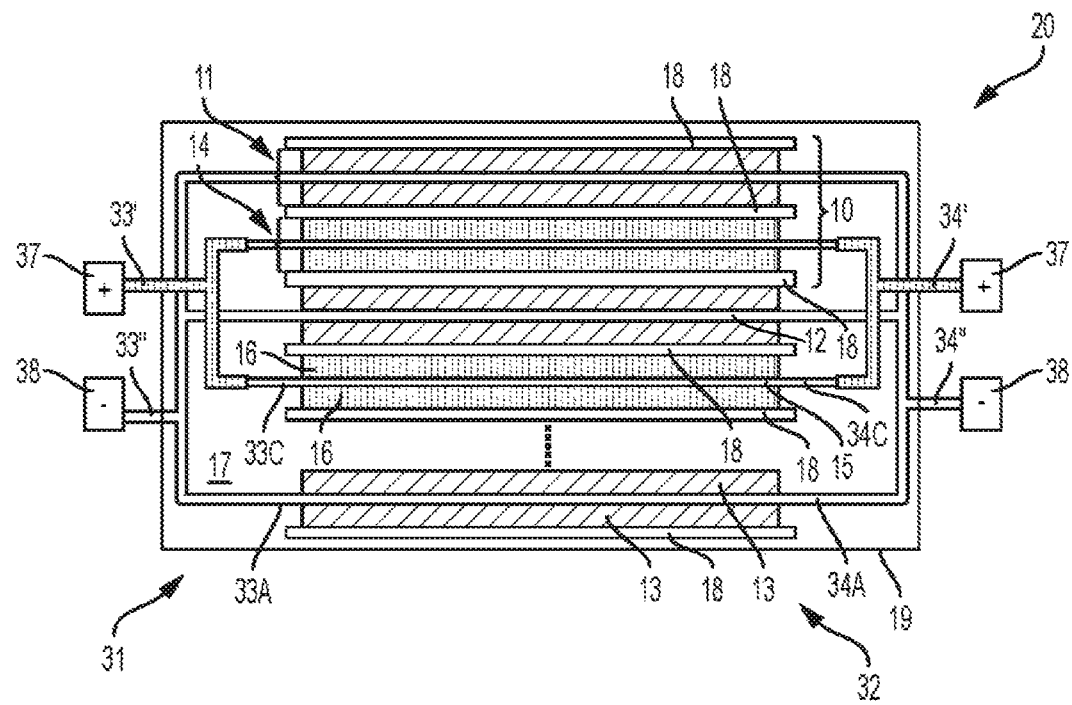
FIG. 4A illustrates a schematic side view of a battery pack, according to one or more embodiments.
Figure 4B:
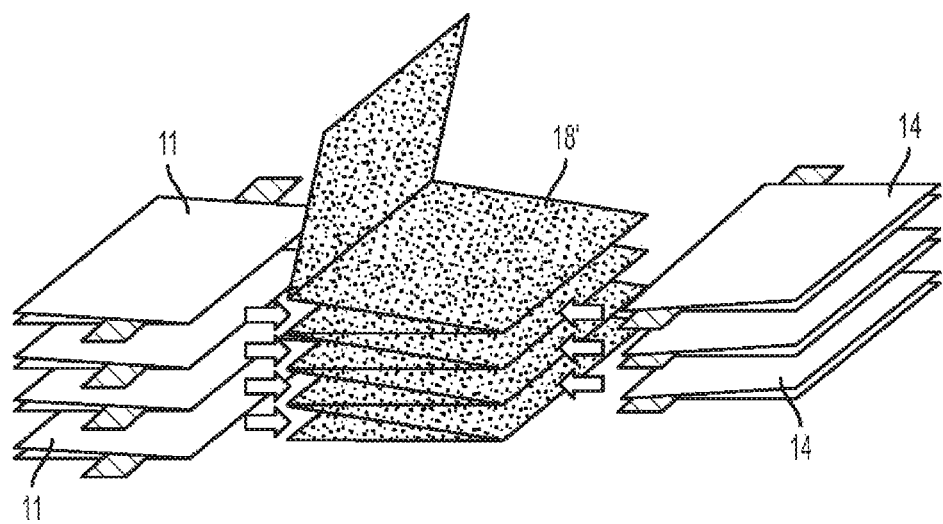
FIG. 4B illustrates a perspective view of a battery separator and a plurality of anodes and a plurality of cathodes, according to one or more embodiments.

FIG. 4A illustrates a schematic side view of a battery pack 20 comprises a plurality of anodes 11 and cathodes 14, each isolated by a separator 18. Battery pack 20 can comprise a plurality of battery cells 10, wherein each battery cell 10 comprises an anode 11 and a cathode 14. Generally, each of the anodes 11 and cathodes 14, or alternatively each of the battery cells 10, such that the length-width planes of each electrode are substantially parallel (i.e., within 10 degrees). Such a stacked orientation provides strength and thermal advantages over other electrode configurations, such as wound or coiled electrodes found in "jelly rolls". In some embodiments, a battery cell 10 or a plurality of anodes 11 and cathodes 14 can utilize a Z-type separator 18' as shown in FIG. 4B. A single Z-type separator 18' can be folded one or a plurality of times to accept one or a plurality of anodes 11 and cathodes 14. Specifically, the one or a plurality of folds form a plurality of separator 18' subsections, wherein each subsection can be positioned between two electrodes (e.g., between an anode 11 and a cathode 14). For any number of folds n, separator 18' will comprise n+1 subsections. Separators such as separator 18' can improve manufacturing efficiency, for example.

A plurality of cathodes 14 can be electrically connected at the battery first end 31 via a first cathode busbar 33' and at the battery second end 32 via a second cathode busbar 34'. A plurality of anodes 11 can be electrically connected at the battery first end 31 via a first anode busbar 33" and at the battery second end 32 via a second anode busbar 34". Each busbar can electrically connect to various electrodes via the electrode's respective tab. Specifically, first cathode busbar 33' can connect to one or a plurality of first cathode tab(s) 33C at the battery first end 31, and second cathode busbar 34' can connect to one or a plurality of second cathode tab(s) 34C at the battery second end 32. Similarly, first anode busbar 33" can connect to one or a plurality of first anode tab(s) 33A at the battery first end 31, and second anode busbar 34" can connect to one or a plurality of second anode tab(s) 34A at the battery second end 32. As shown, each busbar electrically connects to a plurality of electrodes inside case 19, and extends outward from case 19 for electrical connection with various other circuitry (not shown). In other embodiments, one or more cell tabs from one or more electrodes can extend outside of case 19 and connect with a respective busbar thereat. Busbars 33' and 34' each connect to a respective positive battery terminal 37, and busbars 33" and 34" each connect to a respective negative battery terminal 38. In some embodiments, busbars 33' and 34' each connect to a common positive battery terminal (not shown) and/or busbars 33" and 34" each connect to a common negative battery terminal (not shown).

Figure 4C:
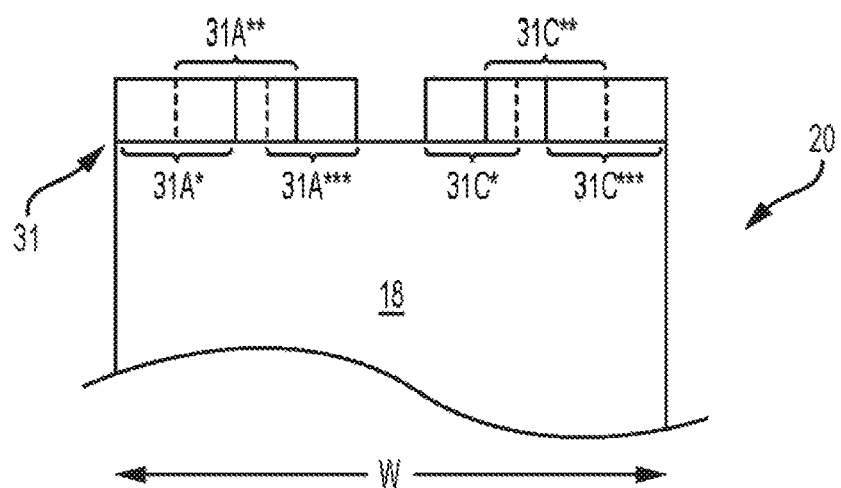
FIG. 4C illustrates a top view of a battery pack, according to one or more embodiments.

In some embodiments, a battery pack 20 comprising a plurality of anodes and a plurality of cathodes can be configured such that one or more of: the first tab of each anode overlaps and contacts the first tab of at least one other anode, the second tab of each anode overlaps and contacts the second tab of at least one other anode, the first tab of each cathode overlaps and contacts the first tab of at least one other cathode, and the second tab of each cathode overlaps and contacts the second tab of at least one other cathode. FIG. 4C illustrates a top view of such a battery pack 20 including a plurality of anodes 11 and a plurality of cathodes 14. FIG. 4C illustrates battery pack 20 as comprising three anodes 11 and three cathodes 14 for the purpose of illustration only, and such illustration is not intended to limit the battery pack to less than 3 anodes 11 and cathodes 14, or more than three anodes 11 and cathodes 14. As illustrated, each of the three anodes include an anode first tab (31A*, 31A, and 31A***) and each of the three cathodes include a cathode first tab (31C*, 31C**, and 31C***). As shown, consecutive anode first tabs overlap, and consecutive cathode first tabs overlap. A similar configuration is practicable at battery pack 20 second end 32 (not shown). In some embodiments, one or more anode first tabs can overlap a plurality of other anode first tabs, and/or one or more cathode first tabs can overlap a plurality of cathode first tabs. A similar configuration is practicable at battery pack 20 second end 32 (not shown). Such a configuration allows for simple and efficient electrical connection of battery cells 10, and allows for tabs to be designed to maximize electrical and thermal performance. Further, overlapping tabs can simplify the manufacture of a battery pack 20. For example, tabs can be laser welded or ultrasonically welded. Once a plurality of tabs are joined, a busbar can electrically connect to a single point, or a reduced number of points to establish electrical connection with the battery pack 20**.

The two-tabbed design of electrode 30, in combination with the particular length:width aspect ratios (hereafter "aspect ratio") described below, can be utilized by lithium metal batteries (e.g., Li—S batteries) and lithium-ion batteries, and lend numerous advantageous to thereto, including improved (i.e., more uniform) current distribution, increased thermal dissipation, reduced resistance, and reduced or eliminated risk of lithium plating, among others. In general, the ease with which lithium ions are reduced creates a risk of undesired lithium plating within lithium-based batteries. For example, at high charging currents, the Li+ ion transport rate to an anode may exceed the rate at which Li+ ions can intercalate into the anode host material. Accordingly, Li+ may deposit as metallic Li as the conditions as lithium ion reduction is preferential to intercalation. This problem can be particular pronounced during fast charging with high current, charging at low ambient temperatures and slowed lithium ion movement, and regenerative breaking in vehicles (i.e., where energy is captured from vehicle breaking and used to charge an appurtenant battery, such as battery 20).

Lithium plating can exacerbate battery performance and degrade the battery's life and durability in a number of ways. In particular, the reduction of free lithium ions causes an irreversible capacity loss within a battery cell, and non-homogeneous dendritic plating can cause short circuiting between two paired electrodes. In particular, non-uniform current distribution can cause or exacerbate lithium plating. The advantages of the two-tabbed electrodes with particular aspect ratios, as described herein, allow for higher charge/discharge voltages with minimal or reduced risk of lithium plating.

The two-tabbed electrodes (e.g., 30) described herein and batteries (e.g., battery cell 10, battery pack 20) utilizing the same are differentiated by their length/width aspect ratios from other types of batteries, such as jellyroll-style batteries which require length/width aspect ratios below 1, and more ideally far below 1 (e.g., 0.01 to 0.001). In particular, electrodes 30 comprise aspect ratios greater than 1. More preferably, electrodes 30 comprise aspect ratios greater than about 2. Most preferably, electrodes 30 comprise aspect ratios greater than about 2.5. In some embodiments, electrodes 30 comprise aspect ratios greater than or equal to about 3. In one example, an electrode 30 can comprise an aspect ratio of about 2.5 to about 10, or about 3 to about 8. In one example, an electrode 30 current collector can comprise a length of about 300 mm to about 600 mm and a width of about 50 mm to about 100 mm. In such an embodiment, the current collector can comprise a thickness of about up to about 0.03 mm, or about 0.005 mm to about 0.025 mm. When an electrode composition (e.g., anode host material or cathode active material) is applied to the electrode top face and/or bottom face, the electrode can comprise a total thickness of up to about 0.5 mm, or about 0.05 mm to about 0.5 mm.

Even though the two-tabbed design slightly reduces the potential energy density of a battery incorporating electrode 30, the dimensions (i.e., aspect ratio) of electrode 30 provide high strength and efficient heat dissipation, while the two tabs provide enhanced electrical properties such as uniform current density. Further, the elongated battery shape offers enhanced packaging aspects in various applications, as a single electrode 30 can replace two smaller electrodes oriented end-to-end and reduces wasted space caused by interior tabs.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A lithium battery cell, comprising:
an electrolyte;
an anode disposed within the electrolyte and including a current collector having a length, the length defining an anode first end, coinciding with a lithium battery cell first end, and an anode second end, coinciding with a lithium battery cell second end, a width, an anode host material disposed on the anode current collector between the anode first end and the anode second end, a first tab extending from the anode first end, and a second tab extending from the anode second end; and
a cathode disposed within the electrolyte and including a current collector having a length, the length defining a cathode first end, coinciding with the lithium battery cell first end, and a cathode second end, coinciding with the lithium battery cell second end, a width, a cathode active material disposed on the cathode current collector between the cathode first end and the cathode second end, a first tab extending from the cathode first end, and a second tab extending from the cathode second end;
wherein the anode has a length to width ratio of at least 2 and the cathode has a length to width ratio of at least 2.

2. The lithium battery cell of claim 1, wherein the first tab of the cathode is asymmetric to the second tab of the cathode, and/or the first tab of the anode is asymmetric to the second tab of the anode.

3. The lithium battery cell of claim 1, wherein the anode has a length to width ratio of at least 3 and the cathode has a length to width ratio of at least 3.

4. The lithium battery cell of claim 1, wherein the anode has a length to width ratio of about 2.5 to about 10, and the cathode has a length to width ratio of about 2.5 to about 10.

5. The lithium battery cell of claim 1, wherein the anode has a length of about 300 millimeters to about 600 millimeters and a width of about 50 millimeters to about 100 millimeters, and the cathode has a length of about 300 millimeters to about 600 millimeters and a width of about 50 millimeters to about 100 millimeters.

6. The lithium battery cell of claim 1, wherein the first tab of the cathode is symmetric to the second tab of the cathode, and/or the first tab of the anode is symmetric to the second tab of the anode.

7. The lithium battery cell of claim 1, further comprising a separator disposed between the anode and cathode and capable of allowing lithium ion transport between the anode and cathode.

8. The lithium battery cell of claim 1, wherein the lithium battery comprises a lithium-ion battery, or a lithium metal battery.

9. A battery pack, comprising:
a plurality of anodes, wherein each anode includes an anode length, the anode length defining an anode first end, coinciding with a battery pack first end, and an anode second end, coinciding with a battery pack second end, an anode width, a first anode tab extending from the anode first end, and a second anode tab extending from the anode second end;
a plurality of cathodes, wherein each cathode includes a cathode length, the cathode length defining a cathode first end, coinciding with the battery pack first end, and a cathode second end, coinciding with the battery pack second end, a cathode width, a first cathode tab extending from the cathode first end, and a second cathode tab extending from the cathode second end;

an anode busbar connecting the plurality of first anode tabs and the plurality of second anode tabs to a negative terminal; and a cathode busbar connecting the plurality of first cathode tabs and the plurality of second cathode tabs to a positive terminal;

wherein each of the anodes have a length to width ratio of at least 2 and each of the cathodes have a length to width ratio of at least 2, and the anodes and cathodes are stacked such that their respective length-width planes are substantially planar.

10. The battery pack of claim 9, wherein the battery pack comprises a power source for an electric or hybrid vehicle.

11. The battery pack of claim 9, wherein the anode has a length to width ratio of about 2.5 to about 10, and the cathode has a length to width ratio of about 2.5 to about 10.

12. The battery pack of claim 9, further comprising a separator disposed between the anode and cathode and capable of allowing lithium ion transport between the anode and cathode.

13. The battery pack of claim 9, wherein the battery pack comprises a lithium-ion battery pack, or a lithium metal battery pack.

14. A battery pack, comprising:
a plurality of stacked battery cells, each cell comprising:
an anode including a length, the length defining an anode first end, coinciding with a battery pack first end, and an anode second end, coinciding with a battery pack second end, a width, a first tab extending from the anode first end, and a second tab extending from the anode second end, and a cathode and including a length, the length defining a cathode first end, coinciding with the battery pack first end, and a cathode second end, coinciding with the battery pack second end, a width, a first tab extending from the cathode first end, and a second tab extending from the cathode second end, wherein the first tab of each anode overlaps and contacts the first tab of at least one other anode, the second tab of each anode overlaps and contacts the second tab of at least one other anode, the first tab of each cathode overlaps and contacts the first tab of at least one other cathode, and the second tab of each cathode overlaps and contacts the second tab of at least one other cathode, and wherein each anode has a length to width ratio of at least 2 and each cathode has a length to width ratio of at least 2.

15. The battery pack of claim 14, wherein at least one pair of overlapping cathode first tabs, cathode second tabs, anode first tabs, or anode second tabs are laser welded or ultrasonically welded.

16. The battery pack of claim 14, further comprising a separator including a plurality of folds defining a plurality of subsections, wherein each sub section is disposed between two anodes, two cathodes, or an anode and a cathode.

17. The battery pack of claim 14, wherein each battery cell comprises a lithium battery cell.

18. The battery pack of claim 14, wherein the battery pack comprises a power source for an electric or hybrid vehicle.

* * * * *